(12) United States Patent
Smith et al.

(10) Patent No.: US 6,497,011 B2
(45) Date of Patent: Dec. 24, 2002

(54) VEHICLE HAVING PARTS CONNECTED WITH A SEALING SPRING FASTENER COMPRISING A HERMETICALLY CLOSED CAVITY

(75) Inventors: Michael Walter Smith, Lake Zurich, IL (US); Richard H. Ducato, Kenosha, WI (US); Mark Fleydervish, Buffalo Grove, IL (US); Werner Politzki, Hawthorn Woods, IL (US); Eustathios Vassiliou, Newark, DE (US)

(73) Assignee: Termax Corporation, Schaumburg, IL (US)

( * ) Notice: Subject to any disclaimer, the term of this patent is extended or adjusted under 35 U.S.C. 154(b) by 0 days.

(21) Appl. No.: 10/091,245

(22) Filed: Mar. 5, 2002

(65) Prior Publication Data

US 2002/0104201 A1 Aug. 8, 2002

Related U.S. Application Data

(62) Division of application No. 09/747,630, filed on Dec. 22, 2000, now Pat. No. 6,381,811.

(51) Int. Cl.[7] .................... A44B 21/00; F16L 33/00
(52) U.S. Cl. .................................. 24/295; 24/289
(58) Field of Search .................... 24/289, 293, 297, 24/295; 52/716.2, 716.5, 716.7, 716.8, 717.04, 717.05, 717.06; 411/508, 509, 510; 277/630, 637, 640, 648, 651; 296/39.1, 191

(56) References Cited

U.S. PATENT DOCUMENTS

| | | | | |
|---|---|---|---|---|
| 4,271,364 A | * | 6/1981 | Andrzejewski | 49/490.1 |
| 4,324,826 A | * | 4/1982 | Ginster | 52/716 X |
| 4,399,644 A | * | 8/1983 | Bright | 52/716.8 |
| 5,173,026 A | * | 12/1992 | Cordola et al. | 411/508 |
| 5,314,280 A | * | 5/1994 | Gagliardi et al. | 411/182 |
| 5,419,606 A | * | 5/1995 | Hull et al. | 296/146.7 |
| 5,533,237 A | * | 7/1996 | Higgins | 24/289 |
| 5,561,961 A | * | 10/1996 | Paul | 52/716.7 |

* cited by examiner

Primary Examiner—Robert J. Sandy
(74) Attorney, Agent, or Firm—E. Vassiliou (57) ABSTRACT

This invention relates to vehicles having parts connected with a sealing spring fastener, which comprises a U-shaped structure, on which an elastic body has been incorporated. The elastic body has a hermetically closed cavity within the U-shaped structure. The sealing spring fastener can form an assembly with an extension of a panel, preferably a plastic panel. The assembly or the fastener by itself can be engaged into the slot of a solid sheet, preferably a metal sheet, in a manner that one side of the sheet is sealed from the other side of the sheet in the vicinity of the slot. In a preferred version, the sealing fastener comprises a substantially non-elastic tough casing around portion of the elastic body in order to avoid rapture during insertion of the fastener into the slot.

29 Claims, 5 Drawing Sheets

VEHICLE HAVING PARTS CONNECTED WITH A SEALING SPRING FASTENER COMPRISING A HERMETICALLY CLOSED CAVITY

RELATED APPLICATIONS

This is a Division of Application Ser. No. 09/747,630, filed Dec. 22, 2000 now U.S. Pat. No. 6,381,811, which is incorporated herein by reference.

FIELD OF THE INVENTION

This invention relates to spring fasteners, vehicles having parts connected with and more particularly those fasteners which are suitable to be engaged in a slot of a solid sheet and support the extension of a panel in a manner that one side of the solid sheet is sealed from the other side around the slot.

BACKGROUND OF THE INVENTION

A number of fasteners have been used in the past for securing one object on another object, as for example, securing an article such as for example a plastic sheet on a metal or other rigid plastic sheet. However, the fasteners being used presently are particularly designed for only a limited number of matching objects to be secured on each other. For sealing purposes, a secondary resilient sheet, or a resilient body attached to the fastener may be used.

Examples of conventional fasteners are disclosed in U.S. Pat. No. 5,987,714 (Smith); U.S. Pat. No. 5,887,319 (Smith); U.S. Pat. No. 5,542,158 (Gronau et al.); U.S. Pat. No. 5,422,789 (Fisher et al.), U.S. Pat. No. 5,373,611 (Murata); U.S. Pat. No. 5,314,280 (Gagliardi); U.S. Pat. No. 5,095,592 (Doerfling); U.S. Pat. No. 4,792,475 (Bien); U.S. Pat. No. 4,683,622 (Ohelke); U.S. Pat. No. 4,609,170 (Schnabl); U.S. Pat. No. 4,245,652 (Kelly et al.); U.S. Pat. No. 3,864,789 (Leitner); U.S. Pat. No. 3,673,643 (Kindell); U.S. Pat. No. 3,525,129 (Holton); U.S. Pat. No. 2,825,948 (Parkin); U.S. Pat. No. 2,607,971 (Bedford, Jr.); U.S. Pat. No. 2,542,883 (Tinnerman); U.S. Pat. No. 2,329,688 (Bedford, Jr.); U.S. Pat. No. 2,322,656 (Murphy), among others.

U.S. Pat. No. 5,887,319; U.S. Pat. No. 5,987,714; patent application Ser. No. 09/493,476, filed Jan. 28, 2000; patent application Ser. No. 09/494,112, filed Jan. 28, 2000; and patent application Ser. No. 09/493,304, filed Jan. 28, 2000; describe fasteners suitable to be used in a slot, and they are all incorporated herein by reference.

SUMMARY OF THE INVENTION

As aforementioned, this invention relates to vehicles having parts connected with spring fasteners characterized by a structure suitable to be engaged in a slot. More particularly, this invention pertains a sealing spring fastener comprising:

- a U-shaped structure having a first side, a second side, a top end and a bottom end;
- a spring leg on each side of the U-shaped structure, extending outwardly from said U-shaped structure in a general direction from the bottom end toward the top end, each spring leg having an attached end and a free end; and
- an elastic body integrally molded on the U-shaped structure at least with the top end, except at least the free end of each extending leg, the elastic body having a closed cavity within the first side and the second side of said U-shaped structure.

It is important that the elastic body comprises an underseal extending under each spring leg. In other words, the underseal is an extension of the elastic body.

The elastic body further comprises a gasket extending away from the closed cavity in the vicinity of the top end. It is also important that the gasket comprises at least one sealing rim, thus improving considerably the sealing properties of the gasket.

The elastic body preferably comprises a compound selected from a group consisting of thermoplastic elastomer, silicone, polyurethane, plastisol, and a mixture thereof. More preferably, the elastic body comprises a thermoplastic elastomer, and even more preferably the elastic body has been molded by insert injection molding.

The free end of each leg is engageable with a slot of a solid sheet. The gasket seals the top of the slot upon engagement of the free end of each slot with the slot of said solid sheet.

The sealing fastener of the present invention preferably further comprises barbs inside the closed cavity having a general direction from the top end toward the bottom end of the U-shaped structure.

The present invention also pertains a vehicle comprising two parts connected with a sealing spring fastener, the sealing fastener comprising:

- a U-shaped structure having a first side, a second side, a top end, a bottom end, an upper section, and a lower section;
- a spring leg on each side of the U-shaped structure, extending outwardly from said U-shaped structure in a general direction from the bottom end toward the top end, each spring leg having an attached end and a free end;
- a casing surrounding at least partially the lower section of the U-shaped structure, except at least the free end of each extending leg, the casing enclosing a cavity within the first side and the second side of said U-shaped structure, the casing having an upper sector and a lower sector; and
- an elastic body comprised of at least a gasket, the gasket extending away from the closed cavity in the vicinity of the top of the U-shaped structure, the gasket having an upper side and a lower side;
- wherein the casing has lower ultimate elongation, higher Shore hardness, and higher shear strength than the elastic body.

Preferably, the casing has lower ultimate elongation, higher Shore hardness, and higher shear strength than the elastic body. Even more preferably, the casing is substantially non-elastic. Preferably, the cavity is formed at least partially by a portion of the elastic body, said portion of the elastic body being at least partially surrounded by the casing.

The casing may comprise a lip at the upper sector of the casing, the lip being embedded between the upper side and the lower side of the gasket, and the lower sector of the casing may comprise emerging sides. Further, the casing is suitable to be attached or bonded to the elastic body.

The casing may preferably comprise a plastic material which is substantially non-elastic at room temperature, and preferably the elastic body comprises a compound selected from a group consisting of thermoplastic elastomer, silicone, polyurethane, plastisol, and a mixture thereof. Nylon 6,6, preferably containing lubricant, is preferred as the molding material for the casing, while thermoplastic elastomers are preferred as the elastic body.

As also mentioned above, the sealing fastener may further comprise barbs inside the closed cavity having a general direction from the top end toward the bottom end of the U-shaped structure. Further, the barbs are preferably bent for stronger holding or exertion force, as described and claimed in provisional application No. 60/118,046 filed Feb. 1, 1999 and patent application Ser. No. 09/482,714, filed Jan. 13, 2000, both of which are incorporated herein by reference.

Further, this invention is related to a method of making the sealing spring fasteners described above. This method comprises steps of.

(a) forming the U-shaped structure;
(b) forming the casing;
(c) inserting the U-shaped structure into an insert mold;
(d) inserting the casing over the U-shaped structure in the insert mold;
(e) molding the elastic body in said insert mold, thereby forming the sealing spring fastener.

The steps (c) and (d) may be replaced by steps:

(c') making an assembly by inserting the U-shaped structure into the casing; and
(d') inserting the assembly into the insert mold.

This invention also relates to an assembly of a panel having an extension and a sealing spring fastener, according to any of the variations described above, wherein the extension of the panel is inserted into the closed cavity.

This invention also relates to a vehicle comprising two objects connected with any of the fasteners in any of the variations described above.

DESCRIPTION OF THE DRAWING

The reader's understanding of practical implementation of preferred embodiments of the invention will be enhanced by reference to the following detailed description taken in conjunction with perusal of the drawing figures, wherein.

NOTE: composite cross sectional view is defined as a number of superimposed cross sections, parallel to each other, such as for example the cross sections defined by lines A, B, and C of FIGS. 12 and 14. Single cross sectional view is defined as a cross section which is defined for example by only one of the lines A, or B, or C, of FIGS. 12 and 14.

DETAILED DESCRIPTION OF THE INVENTION

As aforementioned, this invention relates to spring fasteners characterized by a structure suitable to be engaged in a slot and secure one article on another article.

More specifically, this invention relates to a sealing spring fastener, which comprises a U-shaped structure, on which an elastic body has been incorporated. The elastic body has a closed cavity within the U-shaped structure. The sealing spring fastener can form an assembly with an extension of a panel, preferably a plastic panel. The assembly or the fastener by itself can be engaged into the slot of a solid sheet, preferably a metal sheet, in a manner that one side of the sheet is sealed from the other side of the sheet.

Referring now to FIGS. 1–4, there is depicted a sealing spring fastener 10, according to a preferred embodiment of the present invention, comprising a U-shaped structure 12 having a first side 14, a second side 16, a top end 18, and a bottom end 20.

On each side 14 and 16 of the U-shaped structure 12 there is a spring leg 22, extending outwardly from the U-shaped structure 12 in a general direction from the bottom end 20 toward the top end 18. Each spring leg 22 has an attached end 24 and a free end 26.

An elastic body 28 is integrally molded on the U-shaped structure 12 at least under the top end 18, with the exception of at least the free end 26 of each extending leg 22. The elastic body 28 has a closed cavity 30 within the first side 14 and the second side 16 of said U-shaped structure 12. The closed cavity 30 has an opening 31. The specific definition of a "closed" cavity is that there is no communication or opening between the cavity and any region outside the cavity except for the opening 31.

Figure 9:
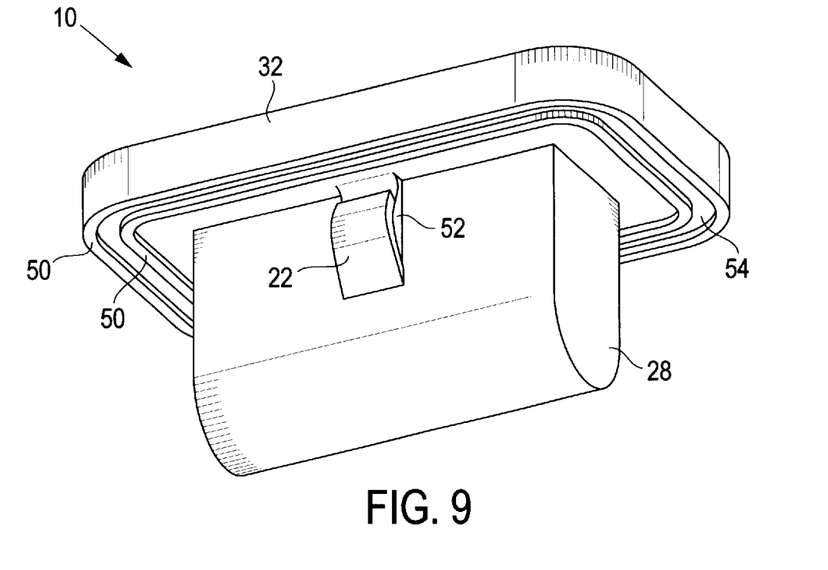
FIG. 9 is a perspective view of the fastener of FIG. 1, in which the elastic body of the fastener comprises an underseal under the spring legs, and sealing rims in the lower side of the gasket.
Figure 10:
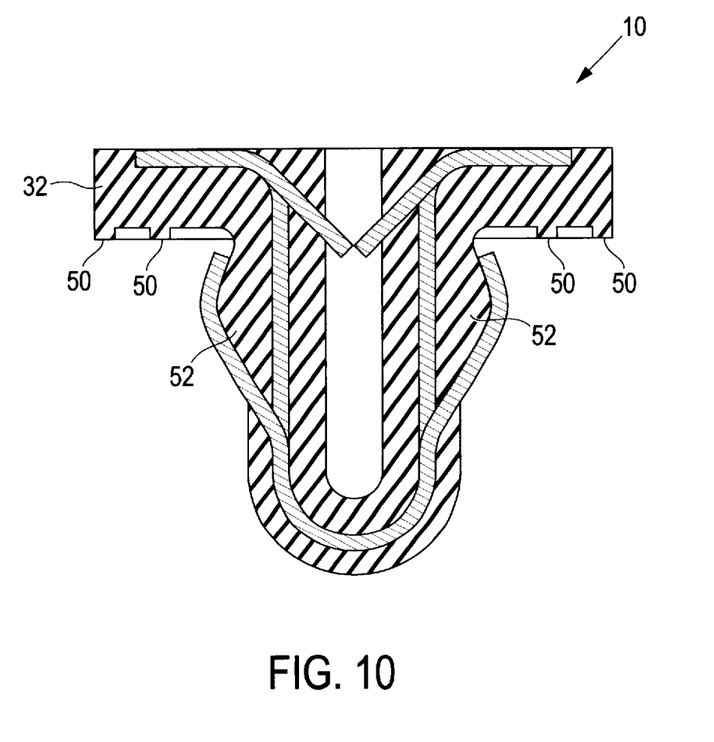
FIG. 10 is a composite cross-sectional view of the fastener of FIG. 1, in which the elastic body of the fastener comprises an underseal under the spring legs, and sealing rims in the lower side of the gasket.

The elastic body preferably extends under each spring leg 22 forming an underseal 52, better shown in FIGS. 9 and 10.

This underseal improves the sealing performance of the fastener when inserted to a slot of a solid panel as discussed hereinbelow.

The U-shaped structure 12 in the vicinity of the bottom 20, especially under the attached end 24 of the legs 22, may also be uncovered (not shown in the figures) by the elastic body 28, as long as the cavity 30 remains as a closed cavity.

The elastic body may be any elastic material such as for example plastisol or polyurethane, more preferably silicone, and even more preferably a thermoplastic elastomer as described in provisional application No. 60/170,112, filed Dec. 10, 1999, and patent application Ser. No. 09/561,505, filed apr. 28, 2000, both of which are incorporated herein by reference. Preferably, the thermoplastic elastomer is molded by insert injection molding, a technique well known to the art.

The free end 26 of each leg 22 is engageable with a slot of a solid sheet The gasket 32 has a lower side 54, which seals the top of the slot upon engagement of the free end 26 of each leg 22 with the slot of said solid sheet, as it will be illustrated in detail hereinbelow. The lower side 54 of the gasket 32 preferably comprises at least one sealing rim 50, which improves considerably the sealing properties of the fastener 10 when it engages to the slot of the solid sheet.

The sealing fastener of the present invention preferably further comprises barbs 34 inside the closed cavity having a general direction from the top end 18 toward the bottom end 20 of the U-shaped structure 12.

Figures 1, 2, 3, 4:
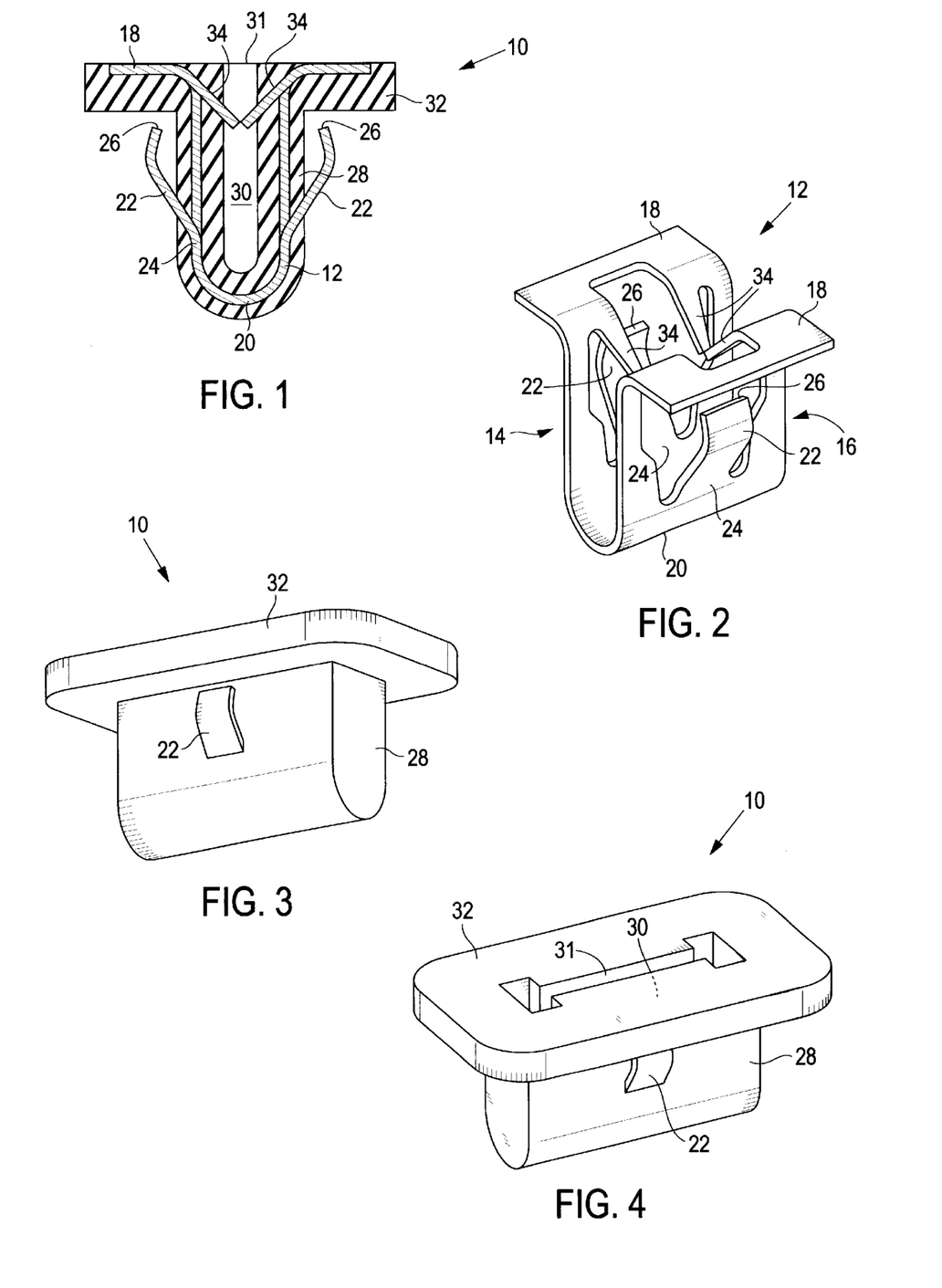
FIG. 1 illustrates a composite cross-sectional view of a sealing spring fastener according to a preferred embodiment of the present invention.
FIG. 2 shows a perspective view of a part of the fastener of FIG. 1 without the elastic body.
FIG. 3 shows a perspective view of the spring fastener of FIG. 1
FIG. 4 shows another perspective view of the spring fastener of FIG. 1
Figure 5:
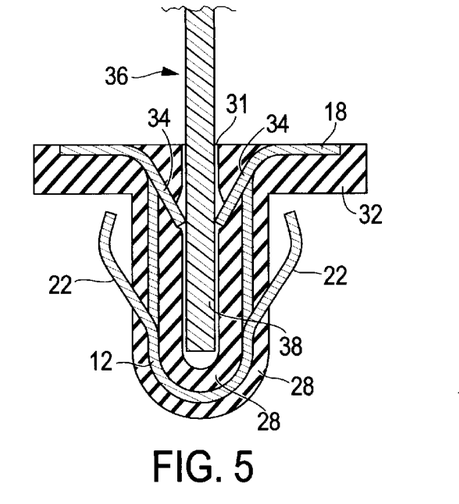
FIG. 5 is a composite cross-sectional view of an assembly of the extension of a panel and the fastener of FIG. 1, wherein the extension is inserted into the closed cavity of the fastener.

The present invention also pertains an assembly of a panel 36, preferably plastic, which has an extension 38, as better shown in FIG. 5 in a composite cross section. The extension 38 has preferably a cross sectional shape commensurate to the shape of opening 31 of the closed cavity 30, so that the extension 38 can be inserted through the opening 31, and secured in the closed cavity 30 by the barbs 34.

Figure 6:
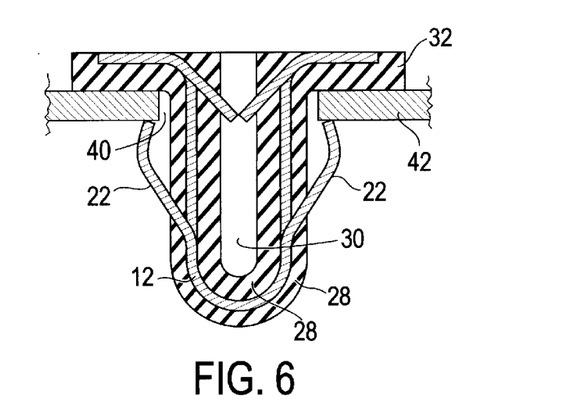
FIG. 6 is a composite cross-sectional view of the fastener of FIG. 1 engaged into a slot of a solid sheet.

FIG. 6, shows a composite cross sectional view of the fastener 10 engaged in a slot 40 of a solid sheet 42, preferably a steel sheet, before insertion of the extension 38 into the closed cavity 30 of the sealing spring fastener 10.

In operation, it is highly preferable that the sealing spring fastener 10 is assembled first with the panel 36 by insertion of the extension 38 into the closed cavity 30, although the fastener may also be engaged into the slot 40, as shown in FIG. 6, before formation of the assembly shown in FIG. 5. This is because during manufacturing the plastic sheet is usually made in one location and transferred to a different location for being placed and secured on the solid sheet in the manufacture of a vehicle, such as an automobile for example. Therefore, it is considerably more convenient, albeit not necessary, to make the assembly of the panel 36 with the fastener 10 at the location of the manufacture of the panel 36 and ship it ready for engagement on the sheet 42 at the location of the final assembly.

The sealing spring fastener 10, after having been assembled with the panel 36, is engaged in the slot 40 of the solid sheet 42. The pressure applied on the gasket 32 of the elastic body, due to the engagement of the legs 22 with the slot 40, seals hermetically said slot 40, taking also into account that the cavity 30 is a closed cavity.

Figure 7:
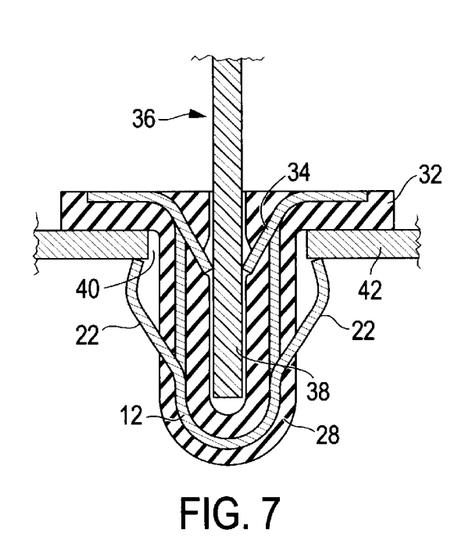
FIG. 7 is a composite cross-sectional view of the assembly of FIG. 5 engaged into a slot of a solid sheet.
Figure 8:
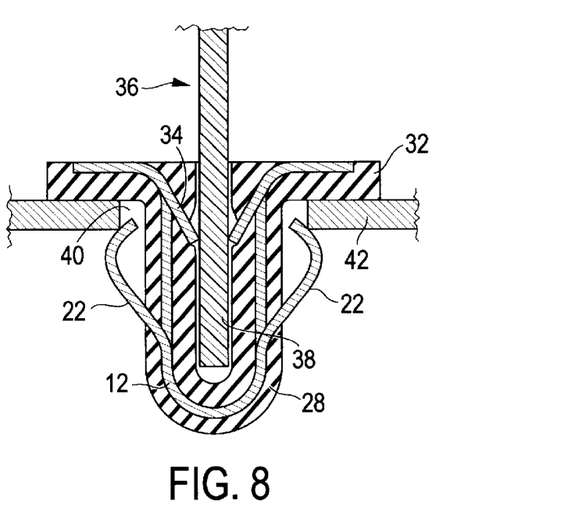
FIG. 8 is a composite cross-sectional view of an assembly similar to that of FIG. 5 engaged into a slot of a solid sheet, wherein the free ends of the legs remain within the slot.

The arrangements shown in FIGS. 6 and 7 provide a more secure engagement of the assembly with the slot 40. However, if disassembling the arrangement is desired, pulling the panel away from the solid sheet will usually result in leaving the fastener 10 engaged in the slot 40. On the other hand, if the legs 22 are such as to provide the engagement shown in FIG. 8, pulling the panel 36 away from the solid sheet will usually result in leaving the fastener 10 still assembled with the panel 36, provided that the barbs 34 provide adequate grabbing force on the panel 36. A preferred type of such barbs is the type described and claimed in provisional application No. 60/118,046 filed Feb. 1, 1999 and patent application Ser. No. 09/482,714, filed Jan. 13, 2000, both of which are incorporated herein by reference.

Figure 18:
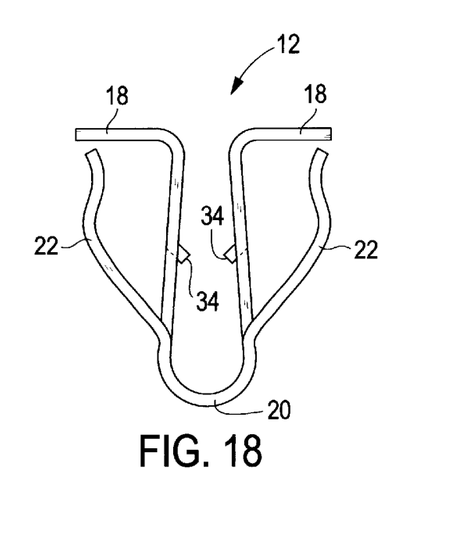
FIG. 18 shows a side view of another preferred U-shaped structure, according to this invention, wherein said U-shaped structure is wider in the vicinity of the bottom end than in the vicinity of the top end. Further, the barbs originate at a point between the vicinity of the bottom end and the vicinity of the top end.

Also, in order to achieve similar results, the U-shaped structure 12, better shown in FIG. 18, may be wider in the vicinity of the bottom end 20 than in the vicinity of the top end 18, with rather short (and therefore less elastic and more robust) barbs between the vicinity of the bottom end 20 and the vicinity of the top end 18.

For many applications, the elastic body 28 shown in FIGS. 1–10, has to be selected very carefully, since in order to have better sealing proprieties, the gasket 32 has to be rather elastic and soft, while in order to avoid rapture, the lower part under the spring legs 22 has to be rather non-elastic and rather hard. In addition, shear strength of the lower part is very important, while the shear strength of the gasket is considerably less important. Thus, a compromise has to be reached for workable results. A Shore hardness in the range of A 30 to A 40, and more preferably in the range of A 33 to A 37 according to ASTM D 2240, combined with an ultimate elongation in the range of 100% to 500%, and more preferably in the range of 150% to 250% according to ASTM D 412, seem to represent optimum ranges of elastomeric materials, as long as an adequate shear strength exists Even so, in many cases this compromise is still unacceptable. The problem of this compromise becomes more pronounced, since in the Automotive Industry, a plurality of extensions 38 extending from a plastic panel are to be inserted in respective slots 40 of a solid or rigid sheet 42, such as metal sheet for example. Small misalignments, therefore, may occur easily due to this multiplicity of slots, and may result in rapture of the lower part of the elastic body under the spring legs 22, as this part is forced through the slots 40.

Examples of commercial thermoplastic elastomers are SANTOPRENE® 111-35 from Advanced Elastomer Systems, Akron, Ohio, MULTIFLEX® 40005 and MULTIFLEX® 30005 from Multibase, Inc., Copley, Ohio, DYNAFLEX® 2706, DYNAFLEX® 6730, and DYNAFLEX® 7702-9 from GLS Corporation, McHenry, Ill., TEKNOR® 5000-NT-40 NT and TEKNOR® 9000-NT-25 NT from Teknor Apex Company, Pawtucket, R.I. 02861.

The present invention resolves this problem of having to compromise according to another more preferred embodiment. According to this embodiment, the gasket is made more elastic and less hard than the lower part under the spring legs 22. Also, the lower part is made to have higher shear strength than the gasket. Shear strength is defined as the stress, usually expressed in pounds per square inch, required to produce fracture when impressed perpendicularly upon the cross section of a material. It might be worth mentioning also that a first material is more elastic than a second material, not only if it presents higher elongation, but also if its strain or % elongation is higher than that of the second material when each is subjected to the same stress.

Elastomers used for the gasket portion of this embodiment are preferably rather soft, having a Shore hardness in the range of 15 A to 30A.

Thus, according to this embodiment of the instant invention, it is highly preferable that the part of the elastic body 28 under the gasket 32 is considerably harder, less elastic, and having a considerably higher shear strength than the gasket.

Figures 11, 12, 13, 14:
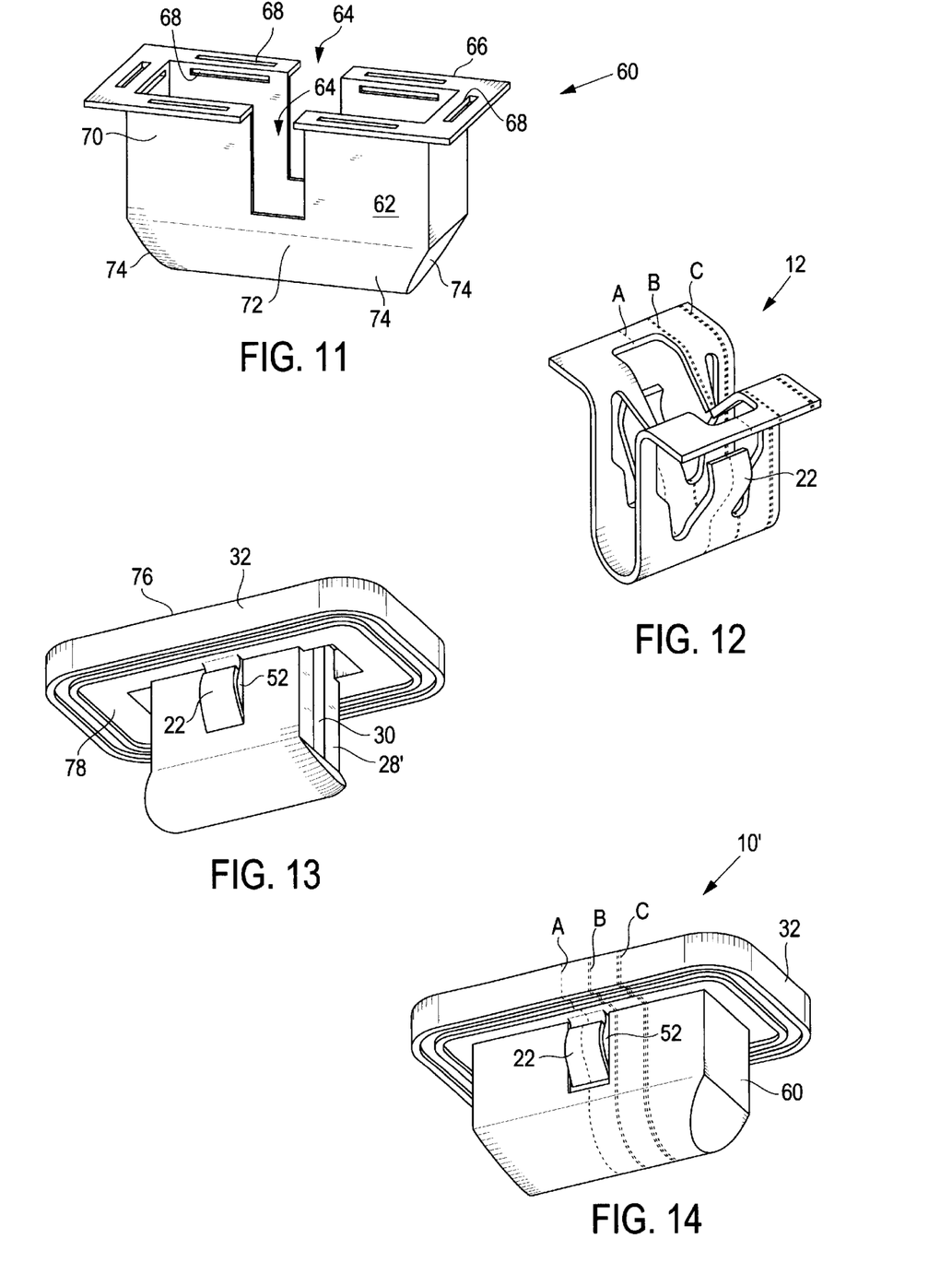
FIG. 11 is a perspective view of a casing, which is part of the fastener shown in FIG. 14, according to a preferred embodiment of the instant invention.
FIG. 12 shows a perspective view of a part of the fastener of FIG. 14 without the casing and the elastic body, and showing lines through which single cross sections pass.
FIG. 13 shows a perspective view of a part of the fastener of FIG. 14 lacking the casing (including the structure of FIG. 12 and the elastic body).
FIG. 14 shows a perspective view of a complete sealing spring fastener according to a preferred embodiment of the present invention.

One way to achieve this is to provide a casing 60, as better shown in FIG. 11, to cover the part of a modified elastic body 28' under the gasket 32. In one example, this casing may be made by injection-molding of a tough and substantially non-elastic polymer, such as nylon 66 or modified nylon 66. Zytel® 101L, 3189, 408L, ST801, are examples of such resins, which are made by DuPont. Of course, other types of resins may be used as long as they satisfy the requirements of the claims.

The casing 60 has a casing body 62 with open portions 64, lips 66, an upper sector 70, and a lower sector 72. The lips 66, including the part of the casing body 62 in the vicinity of the lips may have holes 68, which holes 68 are used for strongly attaching the casing to the modified elastic body 28', as it will be described later in more detail. The holes 68 may have any shape, including round, oblong, oval, etc. The holes may be partially or totally replaced by roughness of the surface, etching of the surface (with hydrochloric acid, for example), bends, embosses, etc., all of which have the purpose make the casing 60 suitable to be attached or bonded to the modified elastic body 28'. The sides 74 of the lower sector 72 are merging together.

FIG. 12 shows a U-shaped structure 12 as already described earlier and shown also in detail in FIG. 4. Lines A, B, and C define different single cross sections in important and different sections of the U-shaped structure.

When making the fastener of the present invention, preferably, the U-shaped structure 12 of FIG. 12 is inserted into the mold, and then the casing 11 is inserted in a manner to surround said U-shaped structure 12, so that the spring legs 22 extend through the cut-off regions 64. Otherwise, the U-shaped structure 12 is inserted into the casing 60, and the assembly of the two is inserted and secured in the mold. In sequence, the elastic body is molded to form the final sealing spring fastener 10' of the present invention, as better shown in FIG. 14. The elastic body 28' surrounding the U-shaped structure 12 with the exception of the spring legs 12 as earlier explained, and in the absence of casing 60, is shown in FIG. 13, for purposes of illustration.

Figure 16:
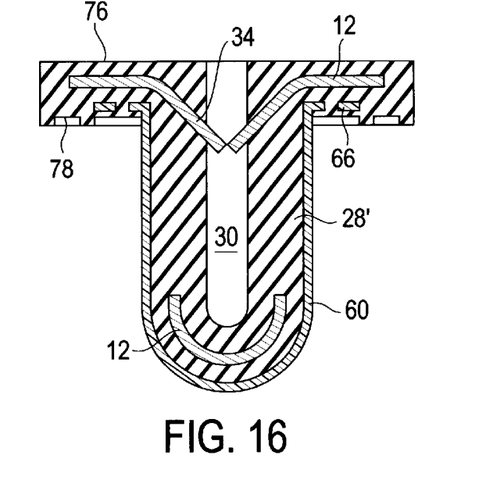
FIG. 16 shows a single cross sectional view through line B, shown in FIGS. 14 and 12.
Figure 17:
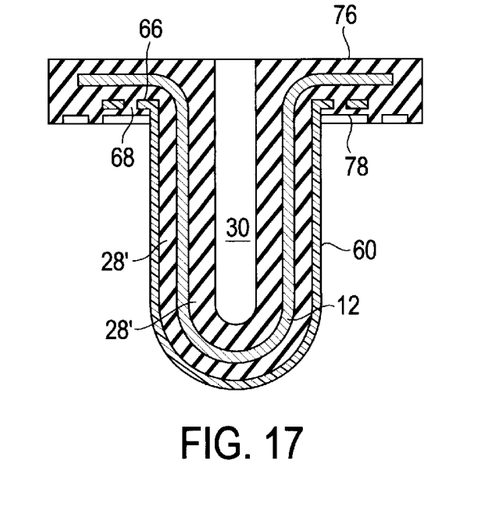
FIG. 17 shows a single cross sectional view through line C, shown in FIGS. 14 and 12.

The lip 66 of the casing 60 is secured between the upper side 76 and the lower side 78 of the gasket 32, as better shown in FIGS. 16 and 17.

Figure 15:
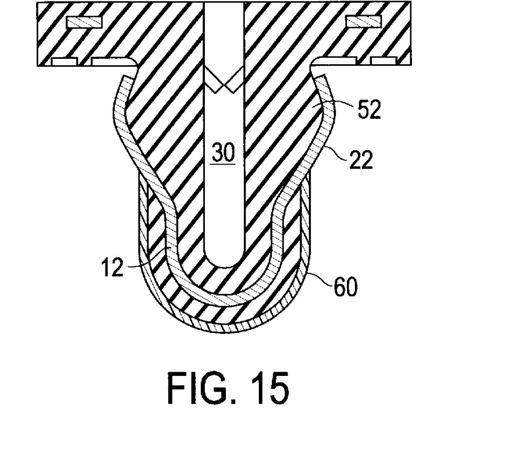
FIG. 15 shows a single cross sectional view through line A, shown in FIGS. 14 and 12.

FIGS. 15, 16 and 17 correspond to single cross sections defined by lines A, B, and C, respectively, which lines are shown in FIGS. 12 and 14.

For a plurality of applications it is critical that the average initial (up to 100% elongation) ratio of stress (in p.s.i) to strain (% elongation) is in the range of about 0.5 to 2 in the case of the elastic body, while it is preferably in the range of about one to three orders of magnitude greater in the case of the casing as compared to that of the elastic body.

The operation of this embodiment is similar to the operation of the previous embodiments. Due to the tough and substantially non-elastic characteristics of the casing 60, as well as to the merging sides, the insertion of said sealing fasteners into metal or other material slots, does not result in rapture, even under considerably misalignment conditions.

The term "elastic" in the context of this invention means "elastomeric" and not just "flexible".

Automobiles or other vehicles may be made, comprising one or more of the fasteners of the instant invention, providing substantial improvements regarding safety, performance and comfort.

Examples of embodiments demonstrating the operation of the instant invention, have now been given for illustration purposes only, and should not be construed as restricting the scope or limits of this invention in any way.

What is claimed is:

1. A vehicle comprising two parts connected with a sealing spring fastener, the sealing spring fastener comprising:
   a U-shaped structure having a first side, a second side, a top end, a bottom end, an upper section, and a lower section;
   a spring leg on each side of the U-shaped structure, extending outwardly from said U-shaped structure in a general direction from the bottom end toward the top end, each spring leg having an attached end and a free end;
   a casing surrounding at least partially the lower section of the U-shaped structure, except at least the free end of each extending leg, the casing enclosing a cavity within the first side and the second side of said U-shaped structure, the casing having an upper sector and a lower sector; and
   an elastic body comprised of at least a gasket, the gasket extending away from the closed cavity in the vicinity of the top of the U-shaped structure, the gasket having an upper side and a lower side;
   wherein the casing has lower ultimate elongation, higher Shore hardness, and higher shear strength than the elastic body.

2. A vehicle as defined in claim 1, wherein the casing is substantially non-elastic.

3. A vehicle as defined in claim 2, wherein the cavity is formed at least partially by a portion of the elastic body, said portion of the elastic body being at least partially surrounded by the casing.

4. A vehicle as defined in claim 3, wherein the casing comprises a lip at the upper sector of the casing, the lip being embedded between the upper side and the lower side of the gasket, and wherein the lower sector of the casing has emerging sides.

5. A vehicle as defined in claim 3, wherein the casing is suitable to be attached or bonded to the elastic body.

6. A vehicle as defined in claim 3, wherein the casing comprises a plastic material which is substantially non-elastic at room temperature, and the elastic body comprises a compound selected from a group consisting of thermoplastic elastomer, silicone, polyurethane, plastisol, and a mixture thereof.

7. A vehicle as defined in claim 6, wherein the U-shaped spring fastener further comprises barbs inside the closed cavity having a general direction from the top end toward the bottom end of the U-shaped structure.

8. A vehicle as defined in claim 6, wherein the sealing spring fastener further comprises an element selected from a group consisting essentially of an underseal extending from the elastic body and disposed under the spring leg, a sealing rib at the lower side of the gasket, and a combination thereof.

9. A vehicle as defined in claim 3, wherein the U-shaped spring fastener further comprises barbs inside the closed cavity having a general direction from the top end toward the bottom end of the U-shaped structure.

10. A vehicle as defined in claim 3, wherein the sealing spring fastener further comprises an element selected from a group consisting essentially of an underseal extending from the elastic body and disposed under the spring leg, a sealing rib at the lower side of the gasket, and a combination thereof.

11. A vehicle as defined in claim 2, wherein the casing comprises a lip at the upper sector of the casing, the lip being embedded between the upper side and the lower side of the gasket, and wherein the lower sector of the casing has emerging sides.

12. A vehicle as defined in claim 11, wherein the sealing spring fastener further comprises an element selected from a group consisting essentially of an underseal extending from the elastic body and disposed under the spring leg, a sealing rib at the lower side of the gasket, and a combination thereof.

13. A vehicle as defined in claim 2, wherein the casing is suitable to be attached or bonded to the elastic body.

14. A vehicle as defined in claim 2, wherein the U-shaped spring fastener further comprises barbs inside the closed cavity having a general direction from the top end toward the bottom end of the U-shaped structure.

15. A vehicle as defined in clam 14, wherein the sealing spring fastener further comprises an element selected from a group consisting essentially of an underseal extending from the elastic body and disposed under the spring leg, a sealing rib at the lower side of the gasket, and a combination thereof.

16. A vehicle as defined in claim 2, wherein the sealing spring fastener further comprises an element selected from a group consisting essentially of an underseal extending from the elastic body and disposed under the spring leg, a sealing rib at the lower side of the gasket, and a combination thereof.

17. A vehicle as defined in claim 11, wherein the cavity is formed at least partially by a portion of the elastic body, said portion of the elastic body being at least partially surrounded by the casing.

18. A vehicle as defined in claim 3, wherein the sealing spring fastener further comprises an element selected from a group consisting essentially of an underseal extending from the elastic body and disposed under the spring leg, a sealing rib at the lower side of the gasket, and a combination thereof.

19. A vehicle as defined in claim 11, wherein the casing comprises a plastic material which is substantially non-elastic at room temperature, and the elastic body comprises a compound selected from a group consisting of thermoplastic elastomer, silicone, polyurethane, plastisol, and a mixture thereof.

20. A vehicle as defined in claim 19, wherein the sealing spring fastener further comprises an element selected from a group consisting essentially of an underseal extending from the elastic body and disposed under the spring leg, a sealing rib at the lower side of the gasket, and a combination thereof.

21. A vehicle as defined in claim 11, wherein the U-shaped spring fastener further comprises barbs inside the closed cavity having a general direction from the top end toward the bottom end of the U-shaped structure.

22. A vehicle as defined in claim 21, wherein the sealing spring fastener further comprises an element selected from a group consisting essentially of an underseal extending from the elastic body and disposed under the spring leg, a sealing rib at the lower side of the gasket, and a combination thereof.

23. A vehicle as defined in claim 1, wherein the sealing spring fastener further comprises an element selected from a group consisting essentially of an underseal extending from the elastic body and disposed under the spring leg, a sealing rib at the lower side of the gasket, and a combination thereof.

24. A vehicle as defined in claim 15, wherein the fastener further comprises at least one sealing rim disposed at the bottom of the gasket.

25. A vehicle as defined in claim 1, wherein the fastener further comprises at least one sealing rim disposed at the bottom of the gasket.

26. A vehicle as defined in claim 25, wherein the elastic body is selected from thermoplastic elastomer, silicone, polyurethane, plastisol, and a mixture thereof.

27. A vehicle as defined in claim 24, wherein the gasket is disposed substantially under the top end of the U-shaped structure.

28. A vehicle as defined in claim 27, wherein the elastic body is selected from thermoplastic elastomer, silicone, polyurethane, plastisol, and a mixture thereof.

29. A vehicle as defined in claim 24, wherein the elastic body is selected from thermoplastic elastomer, silicone, polyurethane, plastisol, and a mixture thereof.

* * * * *